(12) United States Patent
Bourgeois

(10) Patent No.: US 7,596,881 B1
(45) Date of Patent: Oct. 6, 2009

(54) TAPE MEASURE FASTENING KIT

(76) Inventor: Denis A Bourgeois, 12 Timberwood Dr., Apt 105, Goffstown, NH (US) 03045

( * ) Notice: Subject to any disclaimer, the term of this patent is extended or adjusted under 35 U.S.C. 154(b) by 0 days.

(21) Appl. No.: 12/233,198

(22) Filed: Sep. 18, 2008

(51) Int. Cl.
*G01B 3/10* (2006.01)
(52) U.S. Cl. .......................................... 33/770; 33/758
(58) Field of Classification Search ................... 33/770, 33/755, 758–759, 768
See application file for complete search history.

(56) References Cited

U.S. PATENT DOCUMENTS

| | | | | |
|---|---|---|---|---|
| 3,965,579 A | * | 6/1976 | Woods | 33/770 |
| 5,010,657 A | * | 4/1991 | Knapp | 33/770 |
| 5,894,677 A | * | 4/1999 | Hoffman | 33/758 |
| 6,101,734 A | * | 8/2000 | Ten Caat et al. | 33/770 |
| 6,108,926 A | * | 8/2000 | Fraser et al. | 33/768 |
| 6,546,644 B2 | | 4/2003 | Poineau et al. | |
| 6,663,153 B2 | | 12/2003 | Brunson | |
| 6,705,018 B2 | * | 3/2004 | Guhse | 33/770 |
| 6,839,981 B2 | * | 1/2005 | Rafter | 33/770 |
| 6,931,753 B2 | * | 8/2005 | Ryals et al. | 33/758 |
| 7,055,260 B1 | * | 6/2006 | Hoffman | 33/758 |
| 7,181,860 B1 | * | 2/2007 | Umholtz | 33/758 |
| 7,434,330 B2 | * | 10/2008 | McEwan et al. | 33/770 |

* cited by examiner

*Primary Examiner*—Yaritza Guadalupe-McCall

(57) ABSTRACT

A tape measure fastening kit having a series of end pieces in varying lengths to attach to a tab of a tape measure blade so that a single user may secure the tape measure blade to an edge or corner of a work surface. Each end piece has an outer tip which is angled at a 45-degree angle to catch the bottom of the edge or corner of a work surface. Another embodiment provides a solitary L-shaped attachment piece which attaches directly to the top side of the blade at the distal end and which has a lower portion having a 45-degree angled tip to catch the bottom of the edge or corner of a work surface.

4 Claims, 5 Drawing Sheets

TAPE MEASURE FASTENING KIT

BACKGROUND OF THE INVENTION

Various tape measure attachments have been developed in the past for keeping a tape measure in place while measuring. However, what is needed is a tape measure fastening kit which provides a series of tape measure end pieces of varying lengths, which are secured to a tape measure blade, and a 45-degree angle tip on the end of each end piece to ensure that the tape measure is secured to an edge or corner of a work surface thereby allowing a single user to effectively use the tape measure without assistance.

SUMMARY OF THE INVENTION

The present tape measure fastening kit provides a series of tape measure end pieces of varying length, which are secured to a tape measure blade, and a 45-degree angle tip on the end of each end piece, to ensure that the tape measure is secured to an edge or corner of a work surface to allow a single user to effectively use the tape measure without assistance.

The present tape measure fastening kit includes a series of elongated end pieces of varying lengths to be affixed to the end of a tape measure blade having a tab on a distal end to ensure that the tape measure is secured to an edge or corner of a work material surface, the end pieces measuring 1, 2, 3 and 4 inches long and having, on a first end, a tip angled at substantially a 45-degree angle, while also having orifices at an opposite end into which screws are inserted for attaching a desired end piece to the tab on the tape measure blade. Another embodiment provides a solitary L-shaped attachment piece which attaches directly to the distal end of the tape measure blade and which has the same angled tip as an end piece. The tip catches the bottom of a work surface thereby securing the blade to the edge or corner of a work surface. The present kit enables a single user to more effectively use a tape measure, without assistance, by allowing the tape measure blade to be secured to a work material surface. The present kit is easily used, convenient, timesaving, affordable, and cost-effective. The present kit is utilized by a variety of users, including commercial workers including tradespeople, construction laborers, and general maintenance personnel for example, as well as do-it-yourselfers.

As such, the general purpose of the improved tape measure fastening kit which has all of the advantages of the prior art mentioned heretofore and many novel features that result in an improved tape measure fastening kit which is not anticipated, rendered obvious, suggested, or even implied by the prior art, either alone or in combination thereof.

Thus has been broadly outlined the more important features of the improved tape measure fastening kit so that the detailed description thereof that follows may be better understood and in order that the present contribution to the art may be better appreciated.

The objects, features and advantages of the improved tape measure fastening kit will be readily apparent to those of ordinary skill in the art upon reading the following detailed description of presently preferred, but nonetheless illustrative, embodiments of the improved tape measure fastening kit when taken in conjunction with the accompanying drawings. In this respect, before explaining the current embodiments of the improved tape measure fastening kit in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the concept of this disclosure may be readily utilized as a basis for the design of other structures, methods, and kits for carrying out the several purposes of the improved tape measure fastening kit. It is therefore important that the claims be regarded as including such equivalent constructions insofar as they do not depart from the spirit and scope of the present invention.

Objects of the improved tape measure fastening kit, along with various novel features that characterize the invention are particularly pointed out in the claims forming a part of this disclosure. For better understanding of the improved tape measure fastening kit, its operating advantages and specific objects attained by its uses, refer to the accompanying drawings and description.

DETAILED DESCRIPTION OF THE DRAWINGS

Figure 1:
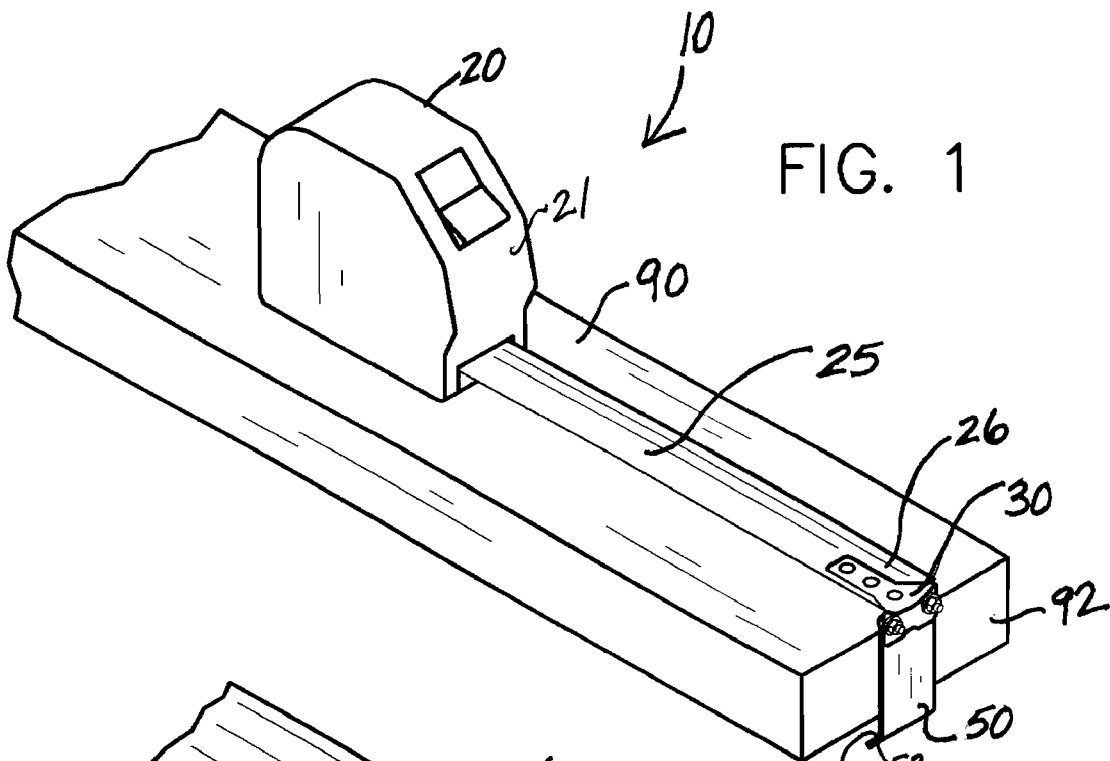
FIG. 1 is an in-use right side isometric view illustrating an end piece attached to a tab of a tape measure blade, which is secured to an edge of a work material surface.
Figure 2:
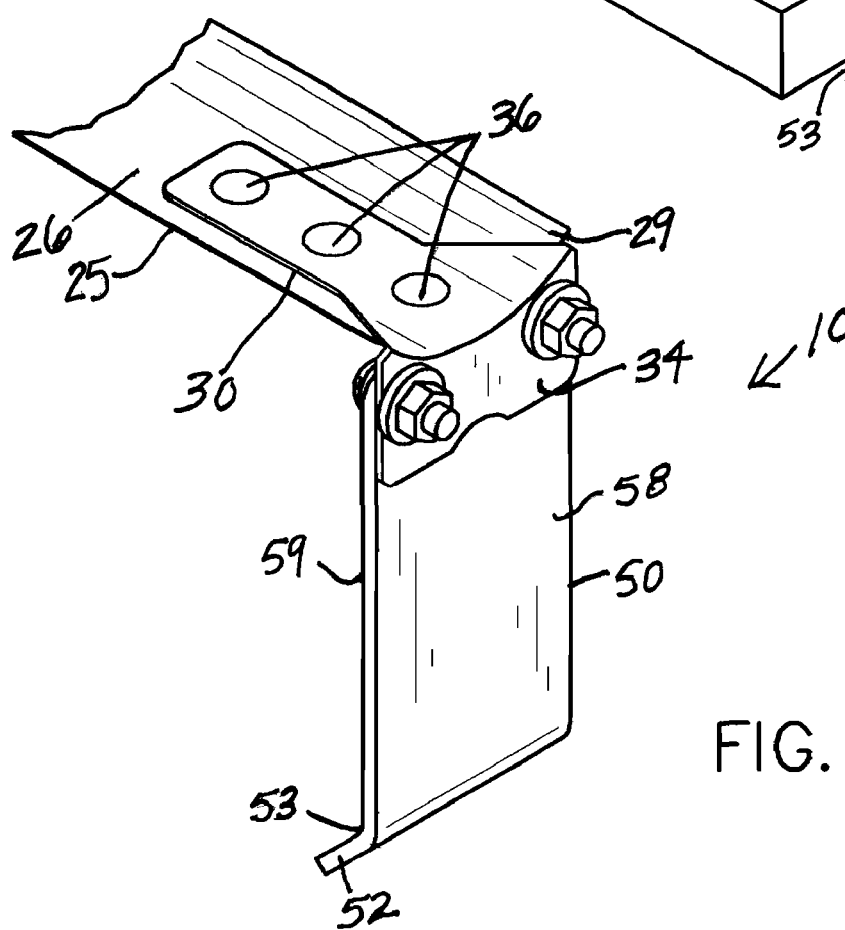
FIG. 2 is a rear isometric view of one embodiment having an added end piece.
Figure 3:
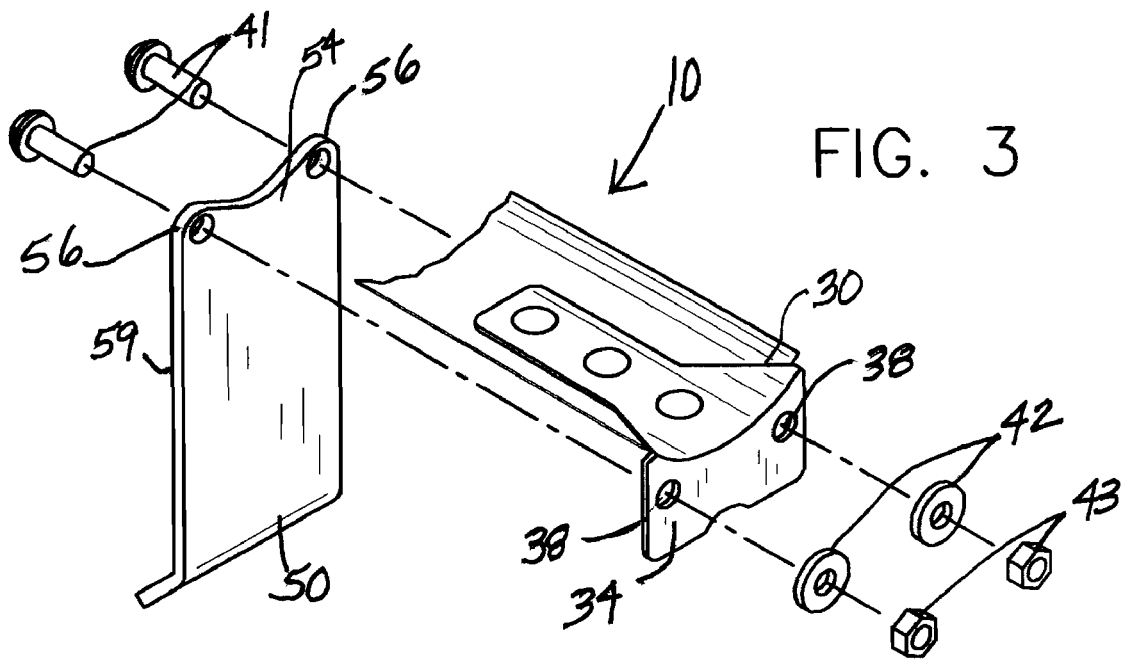
FIG. 3 is an exploded right side isometric view illustrating installation of the embodiment in FIG. 2 to a tape measure blade tab.
Figure 4:
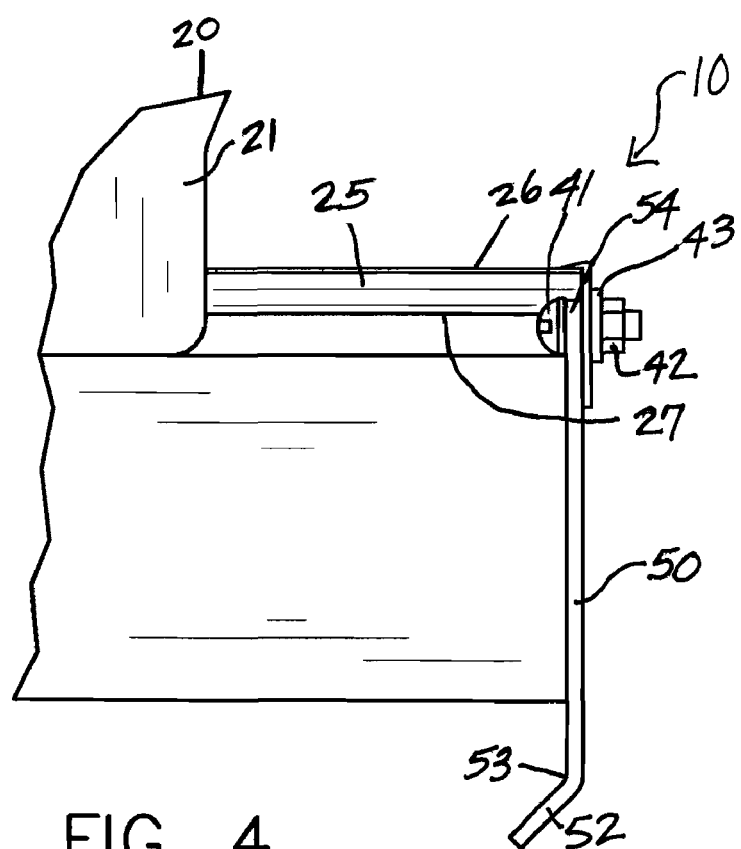
FIG. 4 is a side elevation view illustrating installation of the embodiment in FIG. 2 to a tape measure blade tab.
Figure 5:
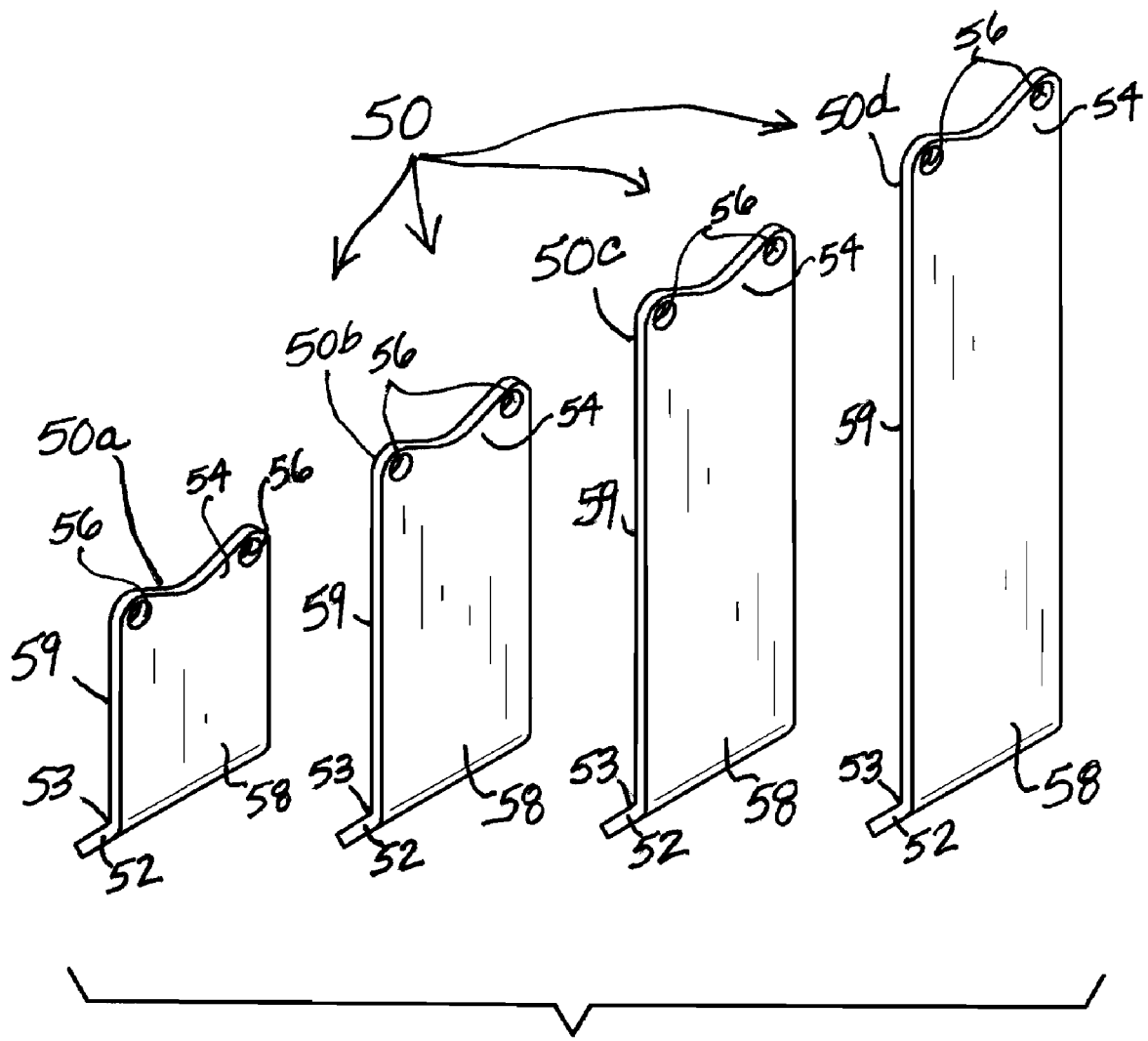
FIG. 5 is a right side isometric view of a plurality of end pieces of varying length.

With reference now to the drawings, and in particular FIGS. 1 through 7 thereof, examples of the employing the principles and concepts of the present tape measure fastening kit, generally designated by the reference number 10, will be described.

Referring to FIGS. 1 through 7, the present tape measure fastening kit 10 provides a tape measure 20 having a housing 21 and a blade 25 retractably extending therefrom, the blade 25 further having a top side 26 and a bottom side 27. The blade 25 has a distal end 29 and is provided with a tab 30 permanently attached to the distal end 29 on the top side 26 of the blade 25. The tab 30 has an upper portion 32 extending slightly beyond the distal end 29 of the blade 25 and a lower portion 34. The tab 30 is slightly narrower than the blade 25. A plurality of apertures 36 are centered in the upper portion 30. The lower portion 34 of the tab 30 provides two holes 38, one hole 38 on each side. A plurality of elongated end pieces 50, each having an outer side 58 and an inner side 59, are also provided by the kit 10. An end piece 50 having a desired length is removably attached to the lower portion 34 of the tab 30. The end pieces 50 are provided in substantially 1-inch increments in a range of substantially 1 to 4 inches in length, thus providing a 1-inch long end piece 50a, a 2-inch long end piece 50b, a 3-inch long end piece 50c, and a 4-inch long end piece 50d, although shorter and longer end pieces 50 may be provided as well. The length range permits end piece 50 selection corresponding to the dimensions of the outer end 92 of a work surface 90. Each end piece 50 has an outer tip 52 and an upper end 54. The outer tip 52 is angled at a substantially 45-degree angle 53. The upper end 54 has a pair of round openings 56 which align with the pair of holes 38 in the tab 30 lower portion 34. A nut 42 and a washer 43 are provided for each opening 56. To removably attach an end piece 50 to a tab 30, a screw 41 is removably inserted first through each opening 56 from the inner side 59 of the end piece 50 with the outer tip 52 angle 53 pointed away from the lower portion 34 of the tab 30 and toward the tape measure, then through the hole 38 of the tab 30, next through a washer 43 and then through a nut 42 which is secured to the screw. However, an end piece 50 may also be attached to a tab 30 by placing the screw 41 through the opening 56 from the outer side 58 of the end piece 50.

Figure 6:
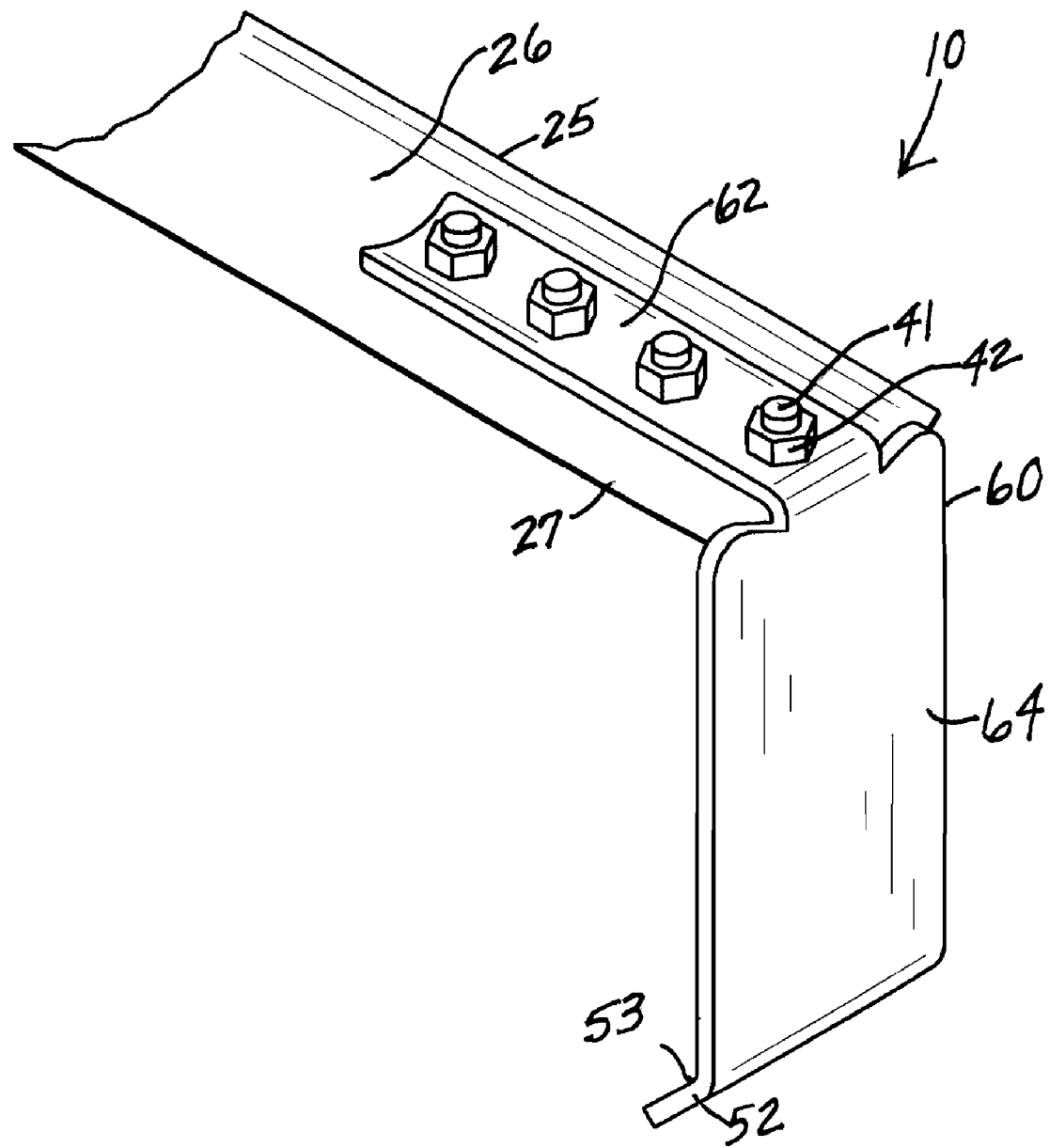
FIG. 6 is a right side isometric view of another embodiment.
Figure 7:
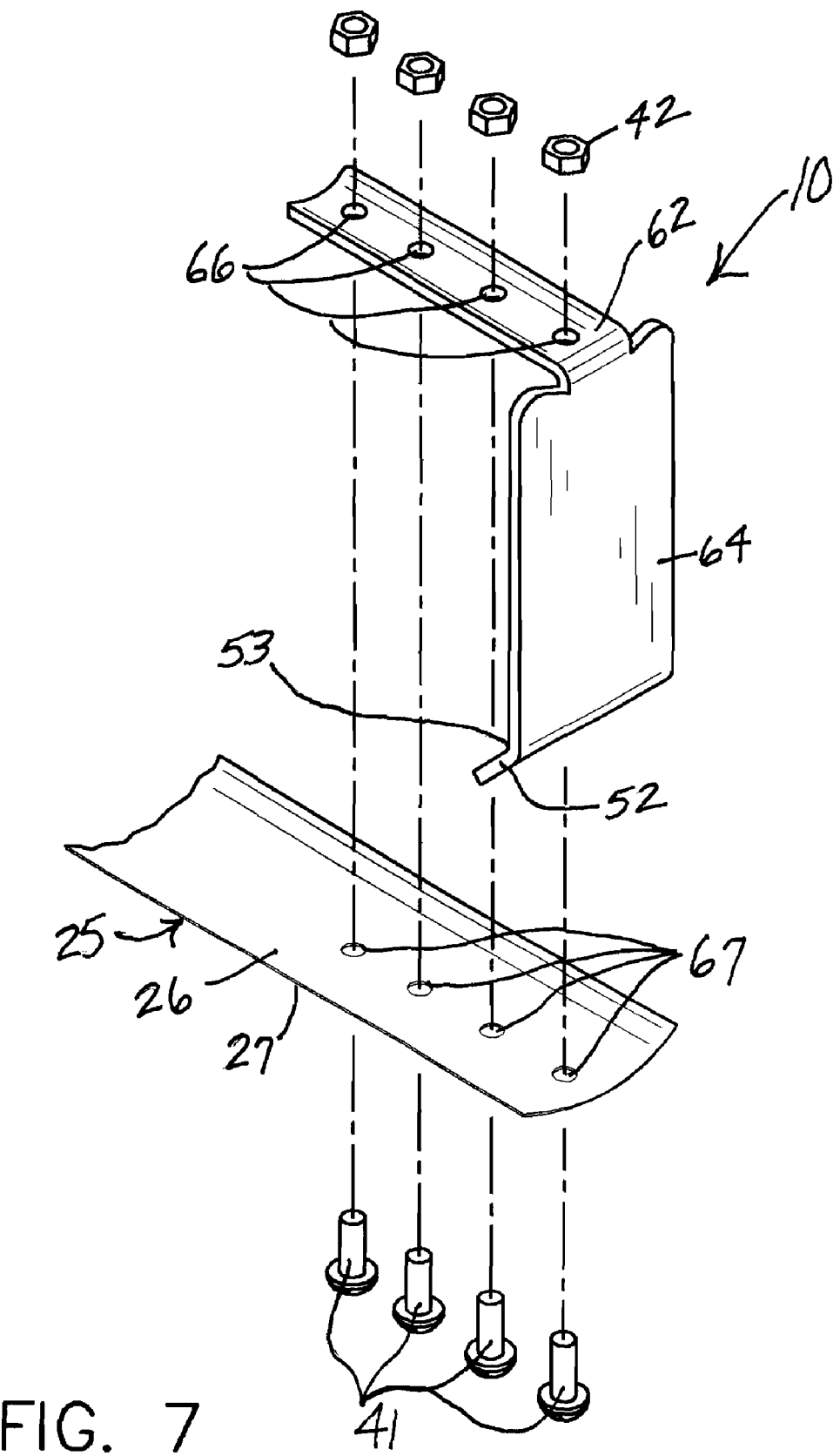
FIG. 7 is an exploded in-use right side isometric view of the embodiment in FIG. 6 illustrating attachment to a tape measure blade.

Another embodiment, illustrated in FIG. 6, is provided which has a solitary L-shaped attachment piece 60 having a top portion 62 and a bottom portion 64. The bottom portion 64 is slightly wider than the top portion 62. The attachment piece 60 has a plurality of circular first orifices 66 in the top portion 62, which are akin to the apertures 36 in the tab 30 of the other embodiment. Each first orifice 66 receives a screw 41 therethrough. The bottom portion 64 has an outer tip 52 angled at a 45-degree angle 53. The blade 25 is provided with at least one second orifice 67 identical to and in alignment with at least one first orifice 66 of the top portion 62. The attachment piece 60 is attached to the top side 26 of a tape measure 20 blade 25 by the insertion of a screw 41 through each orifice 66 of the blade 25 starting from the bottom side 27 of the blade 25 and then through each orifice 66 of the attachment piece 60 top portion 62, wherein the screw is then is secured by nut 42 to the blade 25 top side 26.

Use:

To use the present kit 10, a user selects a desired end piece 50 or attachment piece 60. An end piece 50 must be selected which has a length corresponding to the outer end 92 dimensions of the work surface 90 to be measured. For example, if a user is measuring a 2½" rounded edge counter, the user selects a three-inch long end piece 50c to prevent slippage with the 45-degree angle 53, which does not occur when using a conventional 90-degree tape measure tab. The desired end piece 50a, 50b, 50c, 50d is attached to the tab 30 to the top side 26 on the distal end 29 of the tape measure blade 25. The end piece 50 is then placed over the outer end 92 of a piece of work surface 90 in a position to permit the outer tip 52 to catch the bottom of the work surface 90 to be measured, with the tape measure 20, blade 25 and tab 30 resting on the work surface 90, thereby removably securing the tape measure blade 25 to the work surface 90 for use by a single user without assistance.

If the user selects an attachment piece 60, the user must utilize a blade with at least one second orifice 67 centered therein at the distal end 29 which are identical to and align with the orifices 66 in the top portion 62 of the attachment piece 60. The user attaches the attachment piece 60 to the top side 26 of the blade 25. Then the tape measure 20 is placed atop the work surface 90 to be measured with the blade 25 extended in position wherein the outer tip 52 of the bottom portion 64 catches the bottom of the work surface 90, thereby removably securing the tape measure blade 25 to the work surface 90 for use by a single user without assistance.

With respect to the above description then, it is to be realized that the optimum dimensional relationships for the parts of the present kit, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A tape measure fastening kit comprising, in combination:
   a tape measure having housing and a blade retractably extending therefrom, the blade further having a top side, a bottom side, and a distal end;
   a tab slightly narrower than the blade and extending slightly beyond the blade distal end, the tab having an upper portion and a lower portion wherein the tab is permanently attached to the distal end on the blade top side;
   a plurality of apertures centered in the upper portion;
   a pair of holes in the lower portion of the tab; and
   a plurality of elongated end pieces, each end piece having a different length and further having an outer side, an inner side, a substantially 45-degree angled outer tip, and an upper end having a pair of round openings therein which align with the tab holes, wherein end piece is selectively removably attached to the lower portion of the tab.

2. The tape measure fastening kit of claim 1 wherein the length of the end pieces is selected from the group consisting of substantially 1 inch, substantially 2 inches, substantially 3 inches, and substantially 4 inches, wherein the length permits end piece 50 selection corresponding to the dimensions of the outer end 92 of a work surface 90.

3. The tape measure fastening kit of claim 2 further comprising a screw, a nut and a washer corresponding to each opening, wherein the screw is removably insertable through the opening from the inner side of the selected end piece, through the tab hole, through the washer and through the nut thereby securing the end piece to the tab.

4. The tape measure fastening kit of claim 1 further comprising a screw, a nut and a washer corresponding to each opening, wherein the screw is removably insertable through the opening from the end piece inner side with the outer tip pointed away from the lower portion of the tab and toward the tape measure, through the tab hole, through the washer and through the nut which is secured to the screw, thereby securing the end piece to the tab.

* * * * *